United States Patent [19]

Wheeler

[11] Patent Number: 4,505,033

[45] Date of Patent: * Mar. 19, 1985

[54] METHODS OF MAKING HIGH VOLTAGE RESISTANT MEMBERS

[75] Inventor: Edward S. Wheeler, Batavia, N.Y.

[73] Assignee: Interpace Corporation, Purchase, N.Y.

[*] Notice: The portion of the term of this patent subsequent to Jan. 26, 1999 has been disclaimed.

[21] Appl. No.: 318,619

[22] Filed: Nov. 5, 1981

Related U.S. Application Data

[63] Continuation-in-part of Ser. No. 19,849, Mar. 12, 1979, Pat. No. 4,312,123.

[51] Int. Cl.³ .................... H01B 19/00; H01B 17/02; H01B 17/28
[52] U.S. Cl. ......................... 29/631; 156/86; 156/244.22; 156/294; 156/307.5; 174/143; 174/152 R; 174/179
[58] Field of Search ............... 174/143, 152 R, 178, 174/179, 186, 209; 29/631; 156/86, 244.22, 294, 307.3, 307.5, 307.7, 315

[56] References Cited

U.S. PATENT DOCUMENTS 4,217,466 8/1980 Kuhl .............................. 174/179 X
4,246,696 1/1981 Bauer et al. ..................... 174/179 X

FOREIGN PATENT DOCUMENTS 1189600 3/1965 Fed. Rep. of Germany ... 174/152 R
2650363 11/1977 Fed. Rep. of Germany ...... 174/179
2832543 2/1979 Fed. Rep. of Germany ...... 174/179
2758332 6/1979 Fed. Rep. of Germany ...... 174/179
915052 1/1963 United Kingdom ................ 174/179
1116197 6/1968 United Kingdom ................ 174/179
1292276 10/1972 United Kingdom ................ 174/179
1391249 4/1975 United Kingdom ................ 174/179

Primary Examiner—Laramie E. Askin
Attorney, Agent, or Firm—Charles E. Baxley

[57] ABSTRACT

The invention discloses resulting products and a method of producing high voltage resistant members employed in electrical installations such as bushings and insulators. The method comprises placing a sheath of unvulcanized elastomer on a core, which for example is a fiberglass rod, for example by extruding the sheath thereon, and mounting vulcanized sheds on the sheath therealong, then vulcanizing the sheath to form an integrated high voltage resistant member. The sheath is unvulcanized when the sheds are mounted thereon and then the sheath is heated to vulcanize it, in order to bond it to the sheds and to the core. The sheds also can be molded directly onto the sheath together therewith in steps along the length of the core. For producing a bushing, the sheath is placed on a core formed of a conductive stud wrapped with paper and metal foil and then impregnated with a suitable hardenable resin. The sheds may be stretched on a mandrel at room temperature and then chilled prior to insertion upon the sheath; subsequent warming shrinks the sheds for a tight grip on the sheath.

4 Claims, 7 Drawing Figures

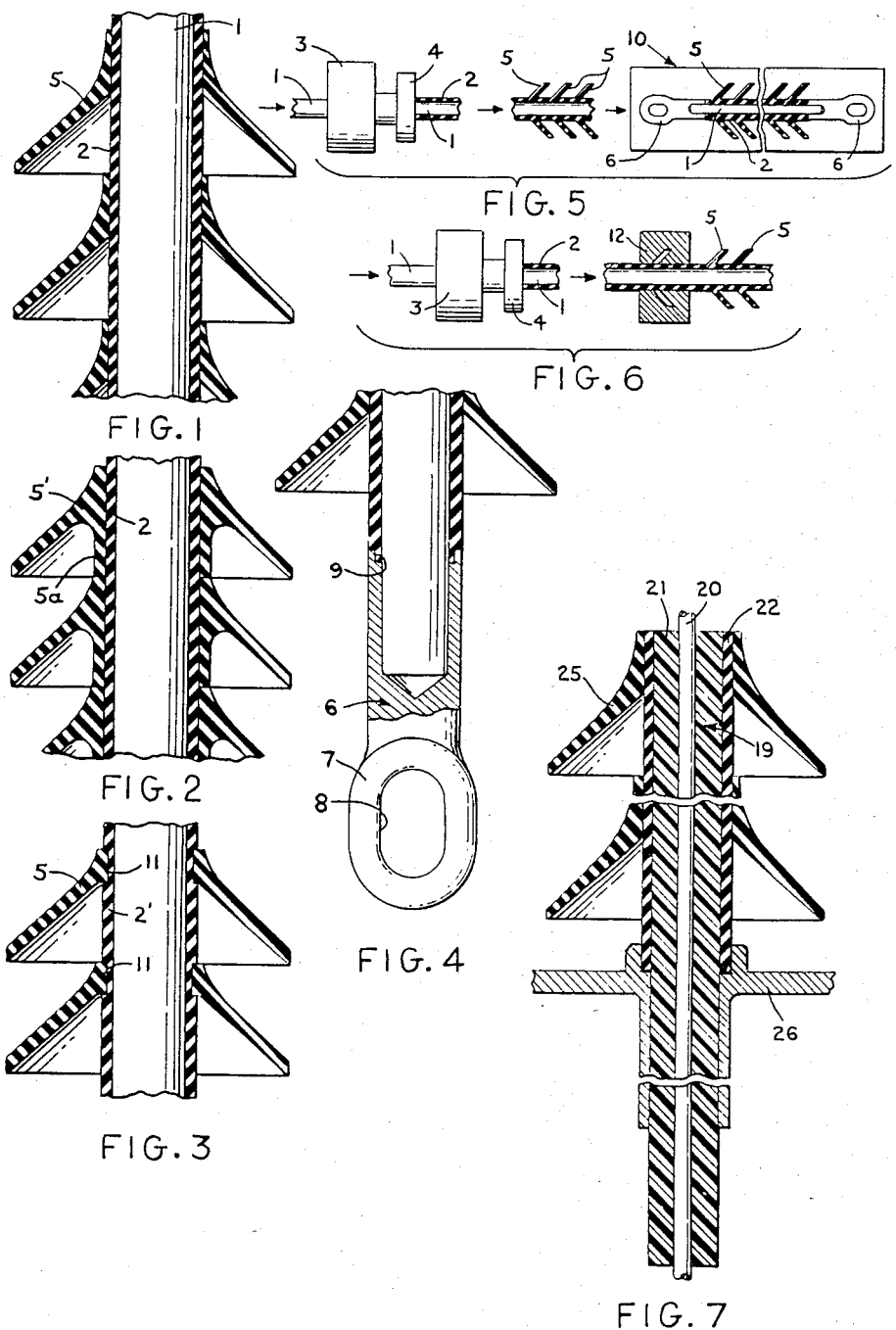

METHODS OF MAKING HIGH VOLTAGE RESISTANT MEMBERS

CROSS REFERENCE TO EXISTING APPLICATION

This is a continuation-in-part to copending U.S. patent application Ser. No. 19,849 filed Mar. 12, 1979, now U.S. Pat. No. 4,312,123.

TECHNICAL FIELD

This invention relates to methods of producing members of various types employed in electrical installations, such as high voltage resistant insulators for outdoor service in supporting high voltage conductors, and bushings for conducting electricity through a wall of a building or a casing of a transformer or circuit breaker. The invention relates likewise to high voltage resistant members so produced.

BACKGROUND ART

High voltage resistant members for outdoor service are known, which typically are made of a fiberglass reinforced resin bonded rod surrounded by a suitable weather resistant material of a shape and construction which will shed rain. Metal fixtures are attached to the rod, for example in service as an insulator, to allow connection to a conductor at one end and to a support structure at the other end.

A number of problems have been found in design, manufacture and application of high voltage resistant members. The problems in part are related to the nature of the weather resistant material surrounding the rod. Epoxy resins were among the earliest materials used as the weather resistant material and it was found that employment of hydrated alumina in large quantities improved their tracking and erosion resistance. This improvement, due to the hydrated alumina, also occurs with other polymers. The epoxy resin formulations which provide the best electrical performance, however, generally are rigid and subject to cracking at low temperatures, especially if the rod is loaded mechanically in tension or cantilever bending.

Various elastomers have been used to improve flexibility of the weather resistant material. These elastomers have included ethylene-propylene-diene monomer rubber (EPDM), ethylene-propylene monomer rubber (EPM), butyl rubber, silicone resins, fluorocarbon polymers and the like. EPM and EPDM are particularly attractive from a cost viewpoint. But the elastomers generally are formed by molding under pressure, though a few are castable. The castable elastomers usually suffer from inadequacies in this regard, such as poor tear strength, and usually are not able to incorporate sufficiently large quantities of hydrated alumina to give the needed performance in tracking and erosion resistance. The moldable elastomers require prohibitively large molds and presses, if the high voltage members are to be molded in one piece.

A number of patents relating generally to construction and manufacture of such high voltage resistant members are listed hereafter:

U.S. Pat. Nos. 1,991,700, Rost; 2,683,185, Morrison; 2,732,423, Morrison; 2,945,912, Imhof; 3,001,004, Black; 3,001,005, Soinnenberg; 3,118,968, Moussou; 3,152,392, Coppack et al.; 3,328,515, Vose; 3,291,899, Ward et al.; 3,356,791, McGowan; 3,358,076, Rebosio; 3,446,741, Hervig et al.; 3,531,580, Foster; 3,544,707, Gamble; 3,549,791, Yonkers; 3,626,083, Minter et al.; 3,800,111, Holmstrom; 3,898,372, Kalb; 4,217,466, Kuhl; 4,246,696, Bauer et al.

British Pat. Nos. 816,926, Coppack; 902,197, Bannerman; 915,052, Sweetland; 1,066,209, Rebosio; 1,116,197, Rebosio; 1,182,045 Rebosio; 1,226,265, British Insulated; 1,292,276, Clabburn et al.

West German No. 28 32 543, Trevisan et al.; 1,189,600 Leeds.

U.S. Pat. No. 3,898,372 discloses a method which circumvents the molding problem of EPM by molding each shed separately and then mounting the sheds over a fiberglass rod and filling the space between the sheds and rod with a silicone grease. This is a simple expedient allowing individually molded sheds to be produced at low cost. However, such a construction creates numerous potential access points for water invasion from the outside to the rod. When the rod becomes wet, it fails electrically. Such wetting could occur during high pressure water washing of the member, a practice used by many electric utilities to remove accumulated contamination.

British Pat. No. 1,182,045 seeks to eliminate the numerous joints by use of a preformed elastomeric sleeve. The internal surface of the sleeve is treated in order to render it bondable to the rod and its inside diameter must be sufficiently greater than the outside diameter of the rod to permit adhesive to be introduced in order to bond the rod and the sleeve together. Adhesive voids can result from such a cumbersome procedure.

U.S. Pat. No. 3,112,357 discloses a conductor with hardenable resinous compositions, but which are not particularly resistant to tracking and erosion when exposed to weather and contamination. Consequently a porcelain housing has been required for outdoor use. Such a procelain housing is both heavy and fragile.

U.S. Pat. No. 4,217,466 discloses a composite insulator comprising a rod of nonsaponifiable resin reinforced with glass fibers of low alkali content, an intermediate layer of a nonsaponifiable moisture repellant polymer surrounding the rod, and screens surrounding said intermediate layer, the screens also being of a moisture repellant nonsaponifiable polymer and containing a filler. Suitable polymers for the screens are those containing ether or acetal groups, for example, silicone rubber or ethylene-propylene rubber. A preferred polymer for the intermediate layer is a polyfunctional polyorganodimethylsiloxane. The screens may be prefabricated and pushed on a prefabricated rod containing the intermediate layer, or may be cast molded onto said prefabricated rod.

U.S. Pat. No. 4,246,696 discloses a composite insulator comprising a prefabricated glass fiber rod surface treated with a silane, a strengthened extruded rubber layer, and a plurality of prefabricated screens slipped over and bonded to the rubber layer. The strengthening of the extruded layer is carried out by incorporating pyrogenic-obtained silicic acid in the rubber.

West German Offenlegungsschrift No. 28 32 543 discloses an electric insulator for medium and high voltage comprising a glass fiber stem and a skirted coating of elastic organic material, said material being compatible with the stem, for example, an ethylene-propylene elastomer with favorable antitracking and antierosion characteristics, high elasticity and aging and flame resistance. Preferably, the skirted coating is a unitary element of the assembly, but my comprise a tubular sleeve and individual shirts. The bond between stem and skirted coating is made with a curing mixture of weakly unsaturated olefinic polymers, which polymers are analogous to and compatible with the ethylene-propylene coating, and which cure at room temperature.

SUMMARY OF THE INVENTION

An object of the invention is to provide a method of producing high voltage resistant insulator or conductor members suitable for outdoor service which method and members avoid the stated deficiencies of the prior art.

In accordance with one aspect of the invention there is provided a method of producing a high voltage resistant member comprising placing a sheath of unvulcanized rubber elastomer on a core, such as a fiberglass reinforced resin bonded rod, mounting one or more vulcanized sheds on said sheath, and then heating the assembly to vulcanize the sheath and bond the sheath to the core and to the shed, so as to form an integrated high voltage resistant member. It should be noted that at the same time the sheath can be vulcanized to terminal fittings in this method.

In accordance further with the invention, the sheath is extruded onto the core.

The heating can be effected in a steam or inert gas autoclave in the absence of oxygen.

In order to achieve heating in an air oven, the sheds are applied against one another to cover the sheath in its entirety.

In accordance further with the invention, the sheds first are expanded, then cooled (the sheds retaining their expanded forms) and then fitted over the sheath. Subsequent warming of the sheds causes them to shrink by virtue of memory, and to fit tightly onto the sheath.

In accordance with a further aspect of the invention, thee is provided a method for producing a high voltage resistant member comprising placing a sheath of elastomer on a core, forming grooves in the sheath, and then mounting vulcanized sheds in the grooves in the sheath, and then vulcanizing the sheath to form an integrated high voltage resistant member.

In yet a further aspect of the invention, the sheds are not separately molded and the method comprises successively molding, in steps lengthwise along a bare core, the sheath of elastomer and at least one shed on the sheath. The sheaths in the successive molding steps are vulcanized together to form a continuous sheath on the core.

In a modification of the above method, a sheath is first placed on the core and the core and sheath are advanced through the mold stepwise and at least one shed of rubber elastomer is molded on the sheath in each step.

The rubber elastomer of the sheath is nonvulcanized when placed on the core and the molding of the sheds on the sheath in each of the steps is effected at a temperature to produce vulcanization of the sheath and bonding thereof to the core and the sheds to form an integrated high voltage resistant member.

The invention contemplates also production of conductive members with an insulative coating, such as bushings (particularly oil-less bushings) wherein the core of the bushing consists of a conductive stud wrapped with paper and stress grading means such as metal foil, and impregnated with a suitable hardenable resin. Epoxy resins are particularly suitable for this application. This core can be formed separately and the sheath placed thereover. Or the conductive stud with the paper and metal foil wrapped thereon can be placed within the sheath and the hardenable epoxy resin can be impregnated therein. In this latter example, curing of the hardenable resin must be accomplished at temperatures below that at which the sheath will vulcanize. The sheds then are mounted on the sheath after which the assembly is heated to vulcanize the sheath and bond same to the core and to the sheds to form an integrated high voltage resistant bushing.

BRIEF DESCRIPTION OF THE DRAWINGS

FIG. 1 is a sectional view of a portion of a high voltage resistant member according to a first embodiment of the invention.

FIG. 2 is a similar section according to a second embodiment of the invention.

FIG. 3 is a similar section according to a third embodiment of the invention.

FIG. 4 is a sectional view taken at one end of the embodiment of the high voltage resistant member of FIG. 1, the opposite end being similar.

FIG. 5 is a diagrammatic illustration of a method for the formation of high voltage members according to the invention.

FIG. 6 is a diagrammatic showing of a method in which the sheds are directly molded onto the sheath of the high voltage members.

FIG. 7 is a sectional view of a high voltage resistant bushing produced in accordance with the method of the invention.

DETAILED DESCRIPTION

FIG. 1 of the drawing shows a portion of a long high voltage resistant insulator for outdoor service. The insulator comprises a rod 1 of insulative material preferably constituted as a fiberglass reinforced resin bonded rod in which the fibers are bonded together with a suitable resin, such as a polyester or epoxy resin, in conventional fashion.

Mounted on the rod 1 is a sheath 2 made of an elastomer formulated for such application. For example, the sheath 2 can be constituted of an ethylene-propylene-diene monomer (EPDM) containing hydrated alumina in large quantity, preferably sixty percent (60%) or more of the formulation. Cross linking or vulcanization may be accomplished by means of known agents, such as an organic peroxide or a known sulfur composition which is activated by heating the polymer to a temperature of at least about 140° C. and preferably to about 180° C. The material preferably should be nontacky when unvulcanized thus permitting easy handling.

Other suitable elastomeric materials include ethylene-propylene copolymer (EPM), silicone elastomers, butyl rubber and fluorocarbon polymers. Silicone resins have been found to be tacky when unvulcanized and therefore they are less suitable for use in the present invention.

The sheath 2 (shown in FIGS. 1-4) can be placed on the rod 1 by passing the rod through the crosshead of a rubber extruder 3 as shown on the left sides of FIGS. 5 and 6. The operation is similar to that used commercially for coating wire and cable. The speed of a rod passing through a crosshead depends upon the diameter of the rod, typically a ⅞" rod will move at several feet per minute through the crosshead. The speed is largely dependent on obtaining a satisfactory continuous coating as the rod exits from the crosshead through a die 4 which regulates the thickness of the coating. The coating can be on the order of a thickness between $\frac{1}{8}$ and $\frac{1}{2}''$. Coatings significantly thinner than $\frac{1}{8}''$ may not provide sufficient weather protection for the rod over long periods of time, and coatings of thickness greater than $\frac{1}{2}''$ are less economical and appear to provide no significantly better properties.

The extrusion of the elastomeric compound onto the rod does not cause the material to reach temperatures sufficient to cause it to vulcanize. The extruded material is allowed to cool in air and is handled easily at room temperature in the case of preferred compositions. Rods of any length may be coated in this manner and successive lengths can be coated in a continuous operation by simply abutting the following rod against its predecessor while feeding it into the crosshead.

Separately molded sheds 5, of the same or similar elastomeric formulation, are made by standard molding techniques such as compression, injection or transfer molding. The sheds 5 are formed with a central hole of a diameter slightly less than that of the rod with the sheath 2 thereon. The sheds are expanded to fit over the sheath and are positioned along the rod at desired locations. The sheds can be spaced at any distance, but most commonly are two to three inches apart. A smaller spacing tends to bridge when exposed to heavy rainfall and greater spacings provide less leakage distance than generally desired in most applications. Nevertheless the sheds easily may be positioned at any desired spacing, which may be at regular or irregular intervals. This ability to space sheds at any interval is an important advance over methods which depend upon sheds abutting one another, thereby fixing both their spacing and the leakage distance per unit length, an unnecessary and undesirable design restriction.

The molding of the sheds results in their vulcanization. The sheds can be heated subsequently in order to enable them to be expanded on a mandrel so that the diameter of the central hole will be larger than that of the sheath 2. The sheds are then cooled on the mandrel. Upon removal from the mandrel while still cool, the sheds maintain their expanded shapes and can be fitted over the sheath 2 and subsequently when warmed the sheds shrink to a tight fit on the sheath. The sheds may be warmed, for example by a hot air gun, after being positioned on the sheath. This warming causes the sheds to return to their original sizes and to grip the sheath. The sheath is not vulcanized by this treatment. This expansion and contraction phenomenon is well known for many elastomeric compositions.

In a variation of the method of the preceding paragraph, the sheds are expanded at room temperature by means of a mandrel so that the central hole of the sheds is slightly larger than the diameter of the rod with the sheath thereon. The expanded sheds, while still on the mandrel, are then cooled, for example, by refrigeration means, removed from the mandrel and slipped over the sheath. Upon warming to room temprature the sheds shrink to their original size, thereby forming a tight grip with the sheath.

At an end of the rod (as seen in FIG. 4) there is provided a metal fitting 6 which allows connection of the member. The details of construction of the fitting are immaterial to the invention and, solely by way of example, the fitting comprises a head 7 formed with an oval eye 8 for attachment to a support or to a high voltage conductor. The end of the fitting preferably is formed with a recess 9 into which a portion of the sheath 2 can extend. The recess 9 can be between one quarter of an inch to one inch in length in order to provide an adequate sealing area of the sheath 2 to the metal fitting 6. The sheath 2 is removed from the rod 1 at its end over a distance of several inches to provide for adequate gripping of the rod 1 by the metal fitting 6. The fittings can be bonded to the bare rod 1 by means of adhesive or they can be held by conventional techniques of swaging of the fitting 6 on the bare end of the rod 1. If adhesive bonding is used, gel temperatures must be such that the sheath is not vulcanized prematurely by any applied heat. Generally the length of bare rod which is gripped by the fitting is about four times the diameter of the rod for maximum strength, whether held by adhesives or by compression fitting. Such a grip length is sufficient to result in rupture of the rod in tension before failure of the attachment means between the rod and fitting.

The assembly of the rod 1, sheath 2, sheds 5 and fittings 6 is then introduced into an autoclave 10 as represented schematically in FIG. 5 and the assembly is then heated to a vulcanization temperature of 140° C. to 200° C. If an adhesive has been employed between the rod and the metal fitting which required an elevated temperature for curing, this curing also will take place during the vulcanization heating step in the autoclave 10.

In forming the assembly as shown in FIG. 1, the autoclave 10 is one containing a steam or inert gas atmosphere from which oxygen is excluded, because oxygen at high vulcanization temperatures would discolor the elastomeric polymer if desired light colored formulations are employed. Pressure is required if the sheds do not entirely cover the unvulcanized sheath on the rod, inasmuch as the heat necessary to cause vulcanization will generate gaseous products in the elastomeric formulation of the sheath that cause it to bloat and erupt in a mass of blisters and craters. A pressure on the order of several atmospheres, preferably 100 to 300 psi, is necessary to prevent such problems at the vulcanization temperatures of 140° to 200° C. The time required for the vulcanization depends upon the mass of material and the thickness of the sheath to be vulcanized, because the sheath must be heated entirely to the desired temperature. Vulcanization generally is achieved in 20 to 60 minutes. After vulcanization the resulting insulator high voltage resistant member is removed from the autoclave 10 and is allowed to cool to room temperature.

In a modification which allows vulcanization to take place at atmospheric pressure in an air oven, the sheds are constructed as shown in FIG. 2 at 5' where they are formed with collars 5a which abut one another so that the sheath 2 is completely covered. In this way, bloating of the sheath is prevented, because formed gases cannot escape at the surface of the sheath. These gases generally are formed by the peroxide curing agents contained in the elastomer composition or by other chemical components thereof.

The particular shape and construction of the collar 5a is adjustable within wide limits and it is only necessary that the sheds and collars entirely enclose the sheath all along the length thereof. Such a construction also fixes spacing of the sheds.

It has been found that in accordance with the method of the invention excellent bonds are formed between the sheds and sheath, between the sheath and the core, and between the sheath and the end fittings. As a consequence, an integrated high voltage resistance member is produced. The bonds between the shed and sheath and that between the sheath and core are necessary to prevent electrical failure along these interfaces while the bond between the sheath and the end fittings is desirable to prevent penetration of moisture to the core at the fittings.

The elastomeric composition of the sheath and the sheds is such as to allow same to extend readily with the core as it expands and contracts due to temperature variations or changing mechanical loads at temperatures from −40° C. to 70° C. which represents the range of temperatures experienced in the intended outdoor high voltage insulator or bushing applications.

In a modification of the invention, as shown in FIG. 3, a modified sheath 2' is provided with grooves 11 for accurate and tight placement of sheds 5. In this modification, the sheath 2' can be vulcanized before the sheds have been assembled in place. The sheds 5 are bonded to the sheath by means of adhesive or if they are tightly fitted to the sheath, the joints between the sheath and the sheds can be sealed with water resistant greases. Sheds 5 can be mounted in place by the expansion and contraction phenomena as previously noted and the presence of the grooves 11 facilitates tight connection of the sheds with the sheath.

FIG. 6 illustrates a modification in the method of the invention and therein it is seen that the rod 1 covered with the sheath 2 as delivered from the extruder 3 is supplied into a mold 12 for stepwise molding of the sheds 5 along the length of the sheath 2. After each shed 5 is molded on the sheath 2, the mold 12 is opened and the rod 1 is advanced to the proper position for the next shed 5. Although the mold 12 in FIG. 6 is shown as forming a single shed 5 during each molding operation, it is possible according to the invention to mold a plurality of sheds 5 on the sheath 2 during each molding step.

The sheath 2 may be unvulcanized when it is introduced into the mold 12 and molding will take place at a temperature to produce vulcanization of the sheath 2 as well as molding of the shed 5 thereon. Though the sheath 2 normally would be unvulcanized, it does not need so to be. As the sheds 5 are formed and vulcanized, they bond themselves to the sheath 2.

In a variation, the sheath 2 and the shed 5 can be molded simultaneously on the rod 1, and in such variation, the bare rod 1 will be introduced into the mold 12.

It has been found that the high voltage resistant members obtained by the methods of this invention are superior to conventional construction by virtue of the continuous elastomeric covering of the fiberglass rod. Furthermore it is found that the high voltage resistant members are manufactured easily at reasonable cost with highly integral interfaces.

In particular, there are no access points to the rod 1 and there is no need for complex and questionable quality steps of surface treatment and bonding of the interior surface of a preformed tube to the rod and to the sheds 5 as in the prior art. Moreover the high voltage resistant members have superior properties, such as tear resistance (as compared to cast elastomers) particularly the silicone resins of the prior art and they have far superior flexibility, particularly at low temperatures (as compared to cast epoxy) also as previously employed. In addition the ability to space the sheds as desired for any application is of considerable value to the customer in solving differing contamination problems, which require different amounts of leakage distance for optimum performance.

FIG. 7 shows a conductive insulated member and more particularly a bushing which is used to conduct electricity through a barrier, such as a wall or container surrounding a transformer or circuit breaker. Such bushings can be capacitively graded or ungraded electrically. Ungraded bushings generally are used only at the lower distribution voltages with air as the dielectric medium. Capacitively graded bushings are more compact. They generally include metal foils placed concentrically about the conductor with the number and shape of the foils depending upon various parameters of the particular application.

FIG. 7 shows a core 19 comprising a conductive rod or tube 20 with a covering 21 formed by winding paper with metal foil interposed therein on the conductor and impregnating the paper and foil with a hardenable resin, such as an epoxy resin. The covering 21 can be produced in accordance with U.S. Pat. No. 2,945,912. The paper and metal foil become encapsulated in a voidfree cast epoxy mass that both protects and insulates the windings. Both filled and unfilled formulations of the impregnating resin may be used.

In conventional solid core bushings it has been found that a heavy fragile porcelain housing is required for weather protection of the core of the bushing. Additionally, a layer of oil is required between the core and the procelain housing, so no gap is present in which partial discharges and radio interference voltages can occur.

The construction as shown in FIG. 7 provides an oil-less bushing which is particularly suitable for use with electrical equipment filled with sulfur hexafluoride. Moreover it eliminates the need for a porcelain housing at the upper end of the bushing as well as need for oil to fill the gap between procelain and core. The procelain housing has been required previously because the preferred hardenable epoxy resin compositions are not particularly resistant to tracking and erosion when exposed to weather and contamination.

In the construction as shown in FIG. 7 an unvulcanized sheath 22 of elastomeric materials, corresponding to the sheath 2 in the previously described embodiments, is fitted around the paper windings and the hardenable resin is impregnated into the windings with the sheath in place. The resin is cured in the sheath 22 at a temperature below that which will cause the sheath to vulcanize. Sheds 25 corresponding to sheds 5, as shown in the previous embodiments, are then mounted on the sheath. The sheds have been separately formed and vulcanized. A mounting flange 26 is positioned on the covering 21 and directly abuts the lower end of sheath 22 or may enclose it partially. The assembly is heated, preferably in an autoclave, to a temperature which produces vulcanization of the sheath, and thereby a weather resistant case formed by the sheds and sheath of relatively little weight will be bonded directly to the covering 21 and flange 26. The sheath 22 becomes vulcanization bonded to the covering 21, to the shed 25 and to the flange 26.

Although the metal mounting flange 26 has been shown as directly bonded to the covering 21, it is possible to extend the sheath 22 to the level of the bottom of the metal flange 26. However, the sheath 22 should not extend below the bottom of the metal flange 26, because this portion of bushing may be immersed in an oil environment and the rubber composition of the sheath may not be oil resistant.

In a modification of the method, the covering 21 is hardened on the conductor rod or tube 20 and then the unvulcanized elastomeric sheath 22 is slid over the coating and the sheds 25 are then placed onto the sheath. The entire assembly is bonded together by means of the unvulcanized sheath 22. Alternately the hardened core can be passed through an extruder crosshead to sheath the rod, in a fashion analogous to the process used for fiberglass reinforced resin bonded rods.

The bushings as shown in FIG. 7 eliminate the need for any oil, yet not at the expense of loss of compact size achieved by grading. Mainly there is no need for the presence of oil between the core 19 and a separate weather resistant porcelain housing as currently used. The elimination of oil is of particular advantage in certain applications, notably where sulfur hexafluoride insulated equipment is employed because any oil which is present from a leak in the bushing will foul the sulfur hexafluoride filtering system. Moreover, the bushing of FIG. 7 eliminates both the need for checking the presence of oil or gas, such as by the use of sight glasses or pressure gauges, and the need for various other parts, such as springs and gaskets, required to maintain tight seals to confine the oil or gas. These bushings which avoid the need for porcelain housings can be made rapidly as delivery time for the procelain usually is the single longest time delay in making bushings to customers' orders.

Although the invention has been described in conjunction with specific embodiments, it will become apparent to those skilled in the art that numerous modifications and variations can be made, without departing from the scope and spirit of the invention. Thus for example, while the sheds have been illustrated as being of conical shape, they could also be flat sheds extending perpendicular to the sheath.

The insulators described herein are primarily of a tension type. One can also make a bushing type construction without a conductive stud, but with optional insulative reinforcing rods in the paper and resin mass. These constructions are particularly suitable for applications in which the forces are primarily compressive or cantilever. These constructions are the subject matter of copending U.S. patent application Ser. No. 933,279 filed Aug. 14, 1978 (now abandoned) wherein Mr. Clark Goshall is the inventor and which is also assigned to the same assignee as the present application. The advantages for horizontal (cantilever) use of such constructions is that a fiberglass reinforced resin bonded rod alone can be made with high quality only up to rather distinct limits of diameter, and consequently to distinct limits of cantilever strength. The construction according to the present invention can be made much thicker in diameter with no particular difficulty.

The invention is not to be taken as limiting except as defined in the claims which follow.

I claim:

1. In a method of making a high voltage resistant integrated member characterized by:
    extruding a sheath of essentially unvulcanized elastomer on a core, said extrusion being performed at a temperature below the vulcanizing temperature of the elastomer, the elastomer being selected from the group consisting of ethylene-propylene-diene copolymers, ethylene-propylene copolymers, and butyl rubber;
    mounting at least one fully vulcanized elastomeric shed on the sheath, the shed being fabricated from a material of the same or similar elastomer formulation as used for the sheath, and
    then heating the core-shed-sheath assemblage to vulcanize the sheath and bond same to the core and to the shed;
    an improvement in the step of mounting before the step of heating to vulcanize comprising:
    expanding the sheds at room temperature to allow fitting them onto the sheath,
    cooling the sheds while maintaining them expanded,
    placing the cooled expanded sheds on the sheath covered core, and
    then allowing the sheds to shrink tightly onto the sheath by warming them to room temperature.

2. In a method of making a high voltage resistant integrated member in the form of an insulated oil-less bushing characterized by:
    forming a core of a conductive rod with paper windings thereabout, said forming including the steps of interposing metal foil within the paper windings and impregnating the windings with a hardenable epoxy resin, and curing said resin at a predetermined temperature;
    extruding a sheath of essentially unvulcanized elastomer on said core, said extrusion being performed at a temperature below the vulcanizing temperature of the elastomer, the elastomer being selected from the group consisting of ethylene-propylene-diene copolymers, ethylene-propylene copolymers and butyl rubber;
    mounting at least one fully vulcanized elastomeric shed on the sheath, the shed being fabricated from a material of the same or similar elastomer formulation as used for the sheath to provide a core-shed-sheath asemblage, and
    then heating the core-shed-sheath assemblage to vulcanize the sheath and bond same to the core and to the shed;
    wherein an improvement in the step of mounting before the step of heating to vulcanize comprises:
    expanding the sheds at room temperature to allow fitting them onto the sheath;
    cooling the sheds while maintaining them expanded;
    placing the cooled expanded sheds on the sheath covered core; and
    then allowing the sheds to shrink tightly onto the sheath by warming them to room temperature.

3. The method according to claims 1 or 2 further characterized in that along with the step of mounting sheds on the sheath there is an additional step of mounting at least one metal fitting onto the core, and sealably securing the fitting to the core.

4. The method according to claim 3 further characterized in that said step of mounting the metal fitting onto the core is performed prior to said vulcanizing step, whereby sid fitting thereby becomes bonded to the sheath.

* * * * *